United States Patent
Ikeda

(10) Patent No.: US 8,638,208 B2
(45) Date of Patent: Jan. 28, 2014

(54) METHOD FOR GENERATING TURN-SIGNAL SOUND OF VEHICLE AND DEVICE USING THE SAME

(75) Inventor: Naohisa Ikeda, Shimada (JP)

(73) Assignee: Yazaki Corporation, Tokyo (JP)

( * ) Notice: Subject to any disclaimer, the term of this patent is extended or adjusted under 35 U.S.C. 154(b) by 184 days.

(21) Appl. No.: 13/379,190

(22) PCT Filed: Aug. 25, 2010

(86) PCT No.: PCT/JP2010/064343
§ 371 (c)(1),
(2), (4) Date: Dec. 19, 2011

(87) PCT Pub. No.: WO2011/027688
PCT Pub. Date: Mar. 10, 2011

(65) Prior Publication Data
US 2012/0098656 A1    Apr. 26, 2012

(30) Foreign Application Priority Data
Sep. 4, 2009  (JP) ................................. 2009-205209

(51) Int. Cl.
*B60Q 1/00* (2006.01)
(52) U.S. Cl.
USPC ............ 340/438; 340/475; 340/458; 340/692
(58) Field of Classification Search
USPC ................. 340/438, 471, 475, 458, 453, 460, 340/384.1, 692, 384.7
See application file for complete search history.

(56) References Cited

U.S. PATENT DOCUMENTS

| | | | |
|---|---|---|---|
| 5,872,508 A | * | 2/1999 | Taoka ........................... 340/436 |
| 5,986,540 A | * | 11/1999 | Nakagaki et al. .......... 340/384.7 |
| 6,933,838 B2 | | 8/2005 | Yamaki et al. |

FOREIGN PATENT DOCUMENTS

| | | |
|---|---|---|
| CN | 1474376 A | 2/2004 |
| JP | 9-022289 A | 1/1997 |
| JP | 10-214090 A | 8/1998 |
| JP | 2007-112347 A | 5/2007 |

OTHER PUBLICATIONS

International Search Report for PCT/JP2010/064343 issued Nov. 22, 2010.
Office Action dated Jul. 15, 2013, issued for the Chinese patent application No. 201080023465.9 and English translation thereof.

* cited by examiner

*Primary Examiner* — Toan N Pham
(74) *Attorney, Agent, or Firm* — Edwards Wildman Palmer LLP

(57) ABSTRACT

There is provided a method for generating turn-signal sound of a vehicle and a device using the method which can output from a speaker the turn-signal sound close to operating sound of a mechanical relay. The method outputs a pulse signal for turn-signal sound having varying frequency and duty ratio from a PPG port of a CPU, integrates the pulse signal for turn-signal sound using an integration circuit to convert into an analog signal for turn-signal sound which is outputted to a speaker. The method also outputs a pulse signal for alarm having the constant frequency and duty ratio, integrates the pulse signal for alarm sound using an integration circuit to convert into an analog signal for alarm sound. Then the analog signals for turn-signal sound and for alarm sound are summed up and outputted to the speaker to produce simultaneously the turn-signal sound and the alarm sound.

5 Claims, 7 Drawing Sheets

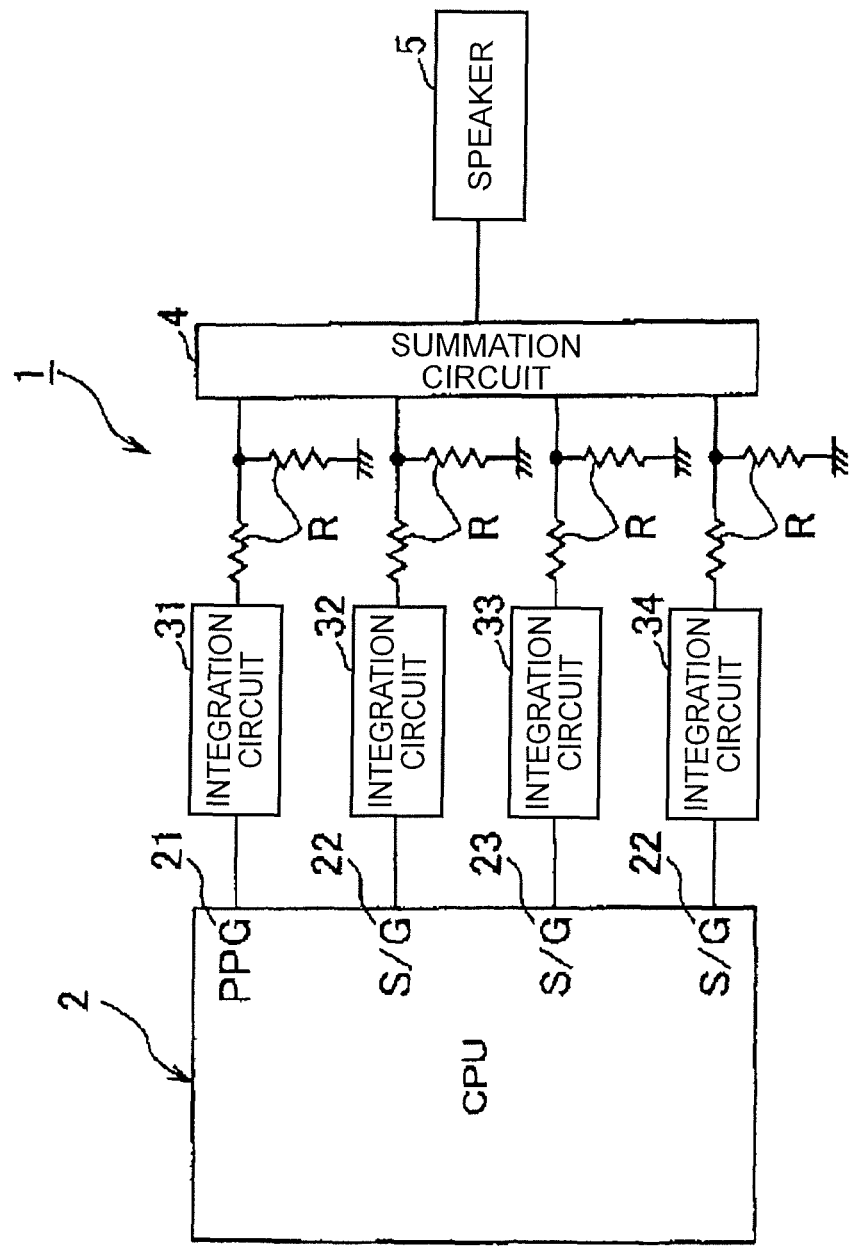

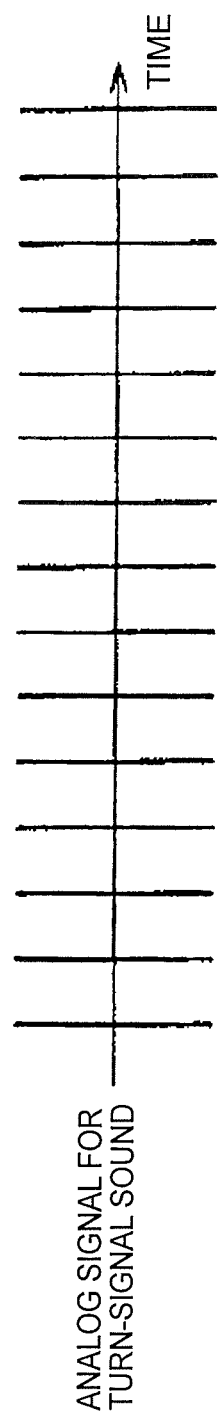
FIG. 4A
FIG. 4B

METHOD FOR GENERATING TURN-SIGNAL SOUND OF VEHICLE AND DEVICE USING THE SAME

FIELD OF THE INVENTION

The present invention relates to a method for generating turn-signal sound of a vehicle and a device for generating turn-signal sound of a vehicle.

DESCRIPTION OF THE RELATED ART

Conventionally, turn-signal sound of a vehicle utilized an operating sound generated by an activated mechanical relay for flashing a turn-signal lamp. In recent years, there is a proposal of using a semiconductor switch for the turn-signal lamp instead of the mechanical relay. However, the turn-signal sound cannot be generated from the semiconductor switch and thus there is a proposal of generating the turn-signal sound by outputting a pulse signal from a sound generator port (hereinafter called an S/G port) of a central processing unit (CPU), converting the pulse signal into an analog signal using an integration circuit, and providing the analog signal to a speaker or a piezoelectric buzzer or the like which is intermittently activated to produce the turn-signal sound.

However, it is difficult to control the pulse frequency and the duty ratio of a pulse signal using the S/G port of the CPU, since the S/G port can only output the pulse signal at a constant frequency with a constant duty ratio. Thus, the resulting sound is a monotonous beep sound which is much different from the operating sound generated by the mechanical relay, causing a discomfort for a user who demands for a more comfortable tone for the turn-signal sound. Furthermore, there is another proposal of producing, from a speaker, the turn-signal sound which is closer to the turn-signal sound generated by the mechanical relay by using a PCM sound source. The PCM sound source outputs a PCM signal obtained from quantizing/encoding the operating sound (analog sound) of the mechanical relay. However, there is a problem that this method requires a D/A converter which causes an increase in the cost.

Furthermore, the above-described CPU is also used to generate an alarm sound from the above-described speaker and the piezoelectric buzzer when an alarm is activated, by outputting the pulse signal to the above-described speaker and the piezoelectric buzzer. Thus, when generating the turn-signal sound and the alarm sound at the same time, there is required a plurality of devices for generating the respective sounds (such as speakers or piezoelectric buzzers), causing an increase in the cost. In addition, in case of providing only a single device, the respective sounds are arranged according to a priority order so that when an event occurs which requires generating the sound with a higher priority order while generating the sound with a lower priority order, the sound with the lower priority order is cancelled in order to generate the sound with the higher priority order. In this case, both of the turn-signal sound and the alarm sound can be produced using the single device, however, the sound with the lower priority order is cancelled when producing both sounds at the same time. As a result, the user may feel uncomfortable.

SUMMARY OF THE INVENTION

Technical Problem

To address the above-described problem, an object of the present invention is to provide a method for generating turn-signal sound of a vehicle which can satisfy the user's demand for the tone of the turn-signal sound at low cost. Another object of the present invention is to provide a device for generating turn-signal sound of a vehicle.

Solution to Problem

The present invention provides, in a first aspect, a method for generating turn-signal sound of a vehicle, including the steps of: outputting a pulse signal for turn-signal sound from a pulse pattern generator, the pulse signal for turn-signal sound having varying frequency and duty ratio; converting the pulse signal for turn-signal sound into an analog signal for turn-signal sound by integrating the pulse signal for turn-signal sound; and outputting the analog signal for turn-signal sound to a speaker.

The present invention provides, in a second aspect, the method as described above, further including the steps of: outputting a pulse signal for alarm sound from a sound generator, the pulse signal for alarm sound having the constant frequency and the constant duty ratio; converting the pulse signal for alarm sound into an analog signal for alarm sound by integrating the pulse signal for alarm sound; summing up the analog signal for turn-signal sound and the analog signal for alarm sound; and outputting the summed signal instead of the analog signal for turn-signal sound to the speaker.

The present invention provides, in a third aspect, the method as described above, wherein the pulse signal for turn-signal sound outputted from the pulse pattern generator has the frequency and the duty ratio arranged to vary according to the frequency and the sound pressure corresponding to the frequency included in an operating sound of a mechanical relay.

The present invention provides, in a fourth aspect, a device for generating turn-signal sound of a vehicle, including: a central processing unit for outputting from a pulse pattern generator a pulse signal for turn-signal sound having varying frequency and duty ratio; an integration unit for integrating the pulse signal for turn-signal sound to convert the pulse signal for turn-signal sound into an analog signal for turn-signal sound; and a speaker to which the analog signal for turn-signal sound is outputted.

Advantageous Effects of the Invention

According to the first and the fourth aspect of the present invention, the pulse signal for turn-signal sound is integrated and outputted to the speaker. Thus, the frequency of the sound outputted from the speaker can be determined according to the pulse signal for turn-signal sound, and the sound-volume of the sound outputted from the speaker can be determined according to the duty ratio of the pulse signal for turn-signal sound. Furthermore, since the frequency and the duty ratio of the pulse signal for turn-signal sound is continuously varying (temporally), the speaker can output the sound having the varying frequency and sound-volume. Thus, due to a characteristic property of a human ear, a person recognizes as if the sound with a plurality of frequencies are generated simultaneously. Therefore, the tone of the turn-signal sound outputted from the speaker can be adjusted by adjusting the frequency and the duty ratio of the pulse signal for turn-signal sound, thereby satisfying the user's particular demand regarding to the tone of the turn-signal sound. Furthermore, since the pulse signal for turn-signal sound is integrated and outputted to the speaker, a D/A converter for decoding is not required, thus the cost can be reduced. Therefore, the user's demand for the tone of the turn-signal sound can be satisfied without increasing the cost.

Furthermore, according to the second aspect of the present invention, the analog signal for turn-signal sound and the analog signal for alarm sound are summed up and the summed signal is outputted to the speaker. Thus, the turn-signal sound and the alarm sound can be outputted simultaneously from a single speaker.

Furthermore, according to the third aspect of the present invention, the frequency and the duty ratio of the pulse signal for turn-signal sound are varying according to the frequency and the sound pressure corresponding to the frequency included in the operating sound of the mechanical relay. Thus, the speaker can output the turn-signal sound close to the operating sound of the mechanical relay, thus the user's demand for the tone of the turn-signal sound can be satisfied.

BRIEF DESCRIPTION OF THE DRAWINGS

FIG. 1 is a block diagram showing one embodiment of a device for generating turn-signal sound of a vehicle according to the present invention;

FIG. 4A is a graph showing a temporal change of an analog signal for turn-signal sound obtained by integrating the pulse signal for turn-signal sound;

FIG. 4B is a graph showing a temporal change of an analog signal for alarm sound obtained by integrating the pulse signal for alarm sound;

DESCRIPTION OF EMBODIMENTS

Figure 2A:
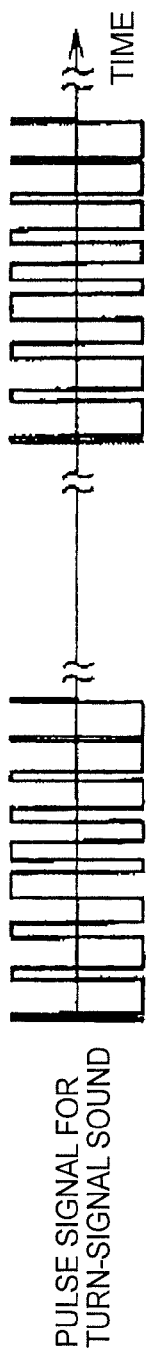
FIG. 2A is a graph showing a temporal change of a pulse signal for turn-signal sound outputted from a PPG port shown in FIG. 1.

The following will describe an embodiment of the present invention in reference with the drawings. As shown in the drawing, a sound-generating device 1 for generating turn-signal sound of a vehicle (herein after called a sound-generating device 1) includes a CPU (central processing unit) 2, a plurality of integration circuits 31-34, a summation circuit 4, a speaker 5 and a voltage-dividing resistor R. The CPU 2 includes a PPG (pulse pattern generator) port 21 for outputting a pulse signal for the turn-signal sound and S/G (sound generator) ports 22-24.

Figure 3A:
FIG. 3A is a graph showing a temporal change of a pulse signal for alarm sound outputted from a S/G port shown in FIG. 1.

Although the PPG port 21 burdens the CPU 2, the PPG port 21 can determine a high-level period and a low-level period of the pulse individually, thus the frequency and the duty ratio of the pulse can be controlled in detail. This PPG port 21 intermittently outputs (e.g. outputs every 5.2 kHz) the pulse signal for turn-signal sound having fast-varying frequency and duty ratio, as shown in FIG. 2A. On the other hand, the frequency and the duty ratio of the pulse cannot be controlled by the S/G ports 22-24 although they do not put much load on the CPU 2. Each of the S/G ports 22-24 intermittently outputs the pulse signal for alarm sound having the constant frequency and the constant duty ratio (e.g. the frequency of 700 Hz and the duty ratio of 50%), as shown in FIG. 3A.

Figure 2B:
FIG. 2B is a graph showing a temporal change of an analog signal for turn-signal sound obtained by integrating the pulse signal for turn-signal sound.

The integration circuit 31-34 described above is a well-known CR filter constituted of a capacitor and a resistor. The above-described integration circuit 31 integrates the above-described pulse signal for turn-signal sound to convert the pulse signal for turn-signal sound into an analog signal for turn-signal sound. The frequency of this analog signal for turn-signal sound is determined by the frequency of the pulse signal for turn-signal sound. In addition, the amplitude of the analog signal for turn-signal sound is determined by the duty ratio of the pulse signal for turn-signal sound. Thus, by integrating the pulse signal for turn-signal sound having the fast-varying frequency and duty ratio, there is obtained the analog signal for turn-signal sound having the fast-varying frequency and amplitude, as shown in FIG. 2B.

Figure 3B:
FIG. 3B is a graph showing a temporal change of an analog signal for alarm sound obtained by integrating the pulse signal for alarm sound.

Furthermore, the integration circuit 32-34 described above is arranged to integrate the pulse signal for alarm sound which is outputted from the S/G port 22-24 to convert the pulse signal for alarm sound into the analog signal for alarm sound. By integrating the pulse signal having the constant frequency and the constant duty ratio, there is obtained the analog signal for alarm sound having the constant frequency and the constant amplitude, as shown in FIG. 3B.

The summation circuit 4 described above is a well-known summation circuit which is arranged to sum up the plurality of analog signals inputted to the summation circuit 4. The summation circuit 4 sums up the analog signal for turn-signal sound and the analog signal for alarm sound which were outputted from the integration circuits 31-34, and then outputs a summed signal to the speaker 5. Each of the voltage-dividing resistors R described above is arranged between the respective integration circuits 31-34 and the summation circuit 4. The voltage-dividing resistor R divides a voltage of the analog signal for turn-signal sound and the analog signal for alarm sound which are outputted from the integration circuits 31-34, respectively, which are then outputted to the summation circuit 4. By adjusting the voltage-dividing resistor R, the magnitude of the analog signal for turn-signal sound and the analog signal for alarm sound can be adjusted before being provided to the summation circuit 4. In this embodiment, the voltage-dividing resistor R is adjusted so that the magnitude of the analog signal for turn-signal sound is larger than the magnitude of the analog signal for alarm sound.

The following will describe the operation of the sound-generating device 1 described above. When a turn-signal switch not shown is turned on, the CPU 2 outputs from the PPG port 21 the pulse signal for turn-signal sound having the fast-varying frequency and duty ratio. Then, the pulse signal for turn-signal sound is provided to the integration circuit 31, in which the pulse signal for turn-signal sound is integrated and converted into the analog signal for turn-signal sound. As described above, the frequency of the analog signal for turn-signal sound is determined by the frequency of the pulse signal for turn-signal sound, and the amplitude of the analog signal for turn-signal sound is determined by the duty ratio of the pulse signal for turn-signal sound. Thus, by integrating the pulse signal for turn-signal sound having the fast-varying frequency and duty ratio, there is obtained the analog signal for turn-signal sound having the fast-varying frequency and amplitude, as shown in FIG. 2B.

Then, the voltage of the obtained analog signal for turn-signal sound is divided by the voltage-dividing resistor R, and then the analog signal for turn-signal sound is provided to the summation circuit 4. If there is no analog signal for alarm sound provided from the integration circuits 32-34, then the summation circuit 4 outputs the analog signal for turn-signal sound to the speaker 5. Then, when the analog signal for turn-signal sound is inputted to the speaker 5, the speaker 5 intermittently outputs a sound having the fast-varying frequency and sound-volume corresponding to the analog signal for turn-signal sound. Due to a characteristic property of a human ear, when a person hears the sound having the fast-varying frequency, the person recognizes as if the sound with a plurality of frequencies are heard simultaneously. Therefore, by controlling the frequency and the duty ratio of the pulse signal for turn-signal sound, the tone of the turn-signal sound can be adjusted. Thus, the turn-signal sound close to the operating sound of the mechanical relay can be outputted from the speaker 5, so the user's demand for the tone of the turn-signal sound can be satisfied.

When an alarm is activated, the pulse signal for alarm sound having the constant frequency and the constant duty ratio is intermittently outputted from the S/G port 22-24 by the CPU 2, as shown in FIG. 3A, and provided to the integration circuit 32-34. The pulse signal for alarm sound is then integrated by the integration circuit 32-34 and converted into the analog signal for alarm sound. By integrating the pulse signal for alarm sound having the constant frequency and the constant duty ratio, there is obtained the analog signal for alarm sound having the constant frequency and the constant amplitude, as shown in FIG. 3B.

Next, the voltage of the obtained analog signal for alarm sound is divided by the voltage-dividing resistor R, and then the analog signal for alarm sound is provided to the summation circuit 4. If there is no analog signal for turn-signal sound outputted from the integration circuit 31, and if there is no more than one analog signal for alarm sound outputted from the integration circuit 32-34, then the summation circuit 4 outputs the analog signal for alarm sound to the speaker 5. Then, when the analog signal for alarm sound is inputted to the speaker 5 and the speaker 5 intermittently outputs sound having the constant frequency and the constant sound-volume according to the analog signal for alarm sound.

Figure 5:
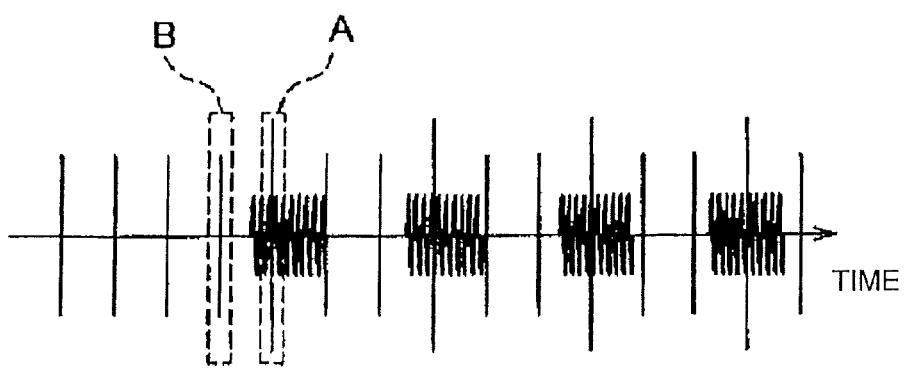
FIG. 5 is a graph showing a signal obtained by summing the analog signal for turn-signal sound and the analog signal for alarm sound shown in FIGS. 4A and 4B, respectively.
Figure 6:
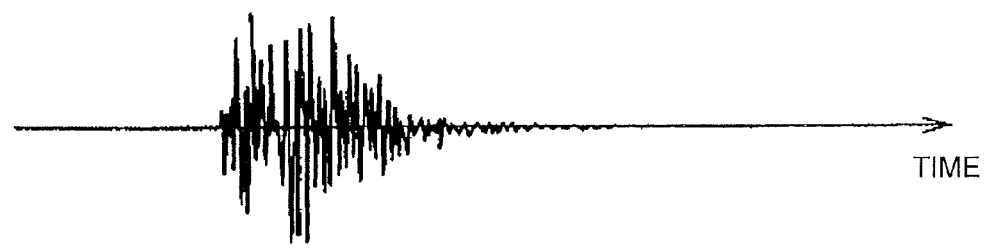
FIG. 6 is a graph with an enlarged temporal axis of a portion A shown in FIG. 5.
Figure 7:
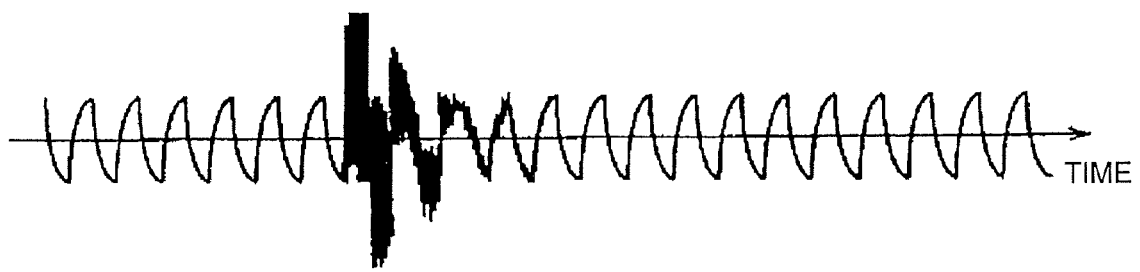
FIG. 7 is a graph with an enlarged temporal axis of a portion B shown in FIG. 5.

On the other hand, when the analog signal for turn-signal sound and the analog signal for alarm sound are outputted to the summation circuit 4 at the same time, as shown in FIGS. 4A and 4B, the summation circuit 4 sums up the analog signal for turn-signal sound and the analog signal for alarm sound, as shown in FIG. 5. The resulting summed signal is constituted of the analog signal for turn-signal sound having the fast-varying frequency and amplitude, which is shown in FIG. 6, superposed on the analog signal for alarm sound having the constant frequency and the constant amplitude. Thus, the summed signal has a wave shape as shown in FIG. 7. Then, the summation circuit 4 outputs the summed signal to the speaker 5. In such manner, the turn-signal sound and the alarm sound can be outputted simultaneously from the speaker 5.

Figure 8:
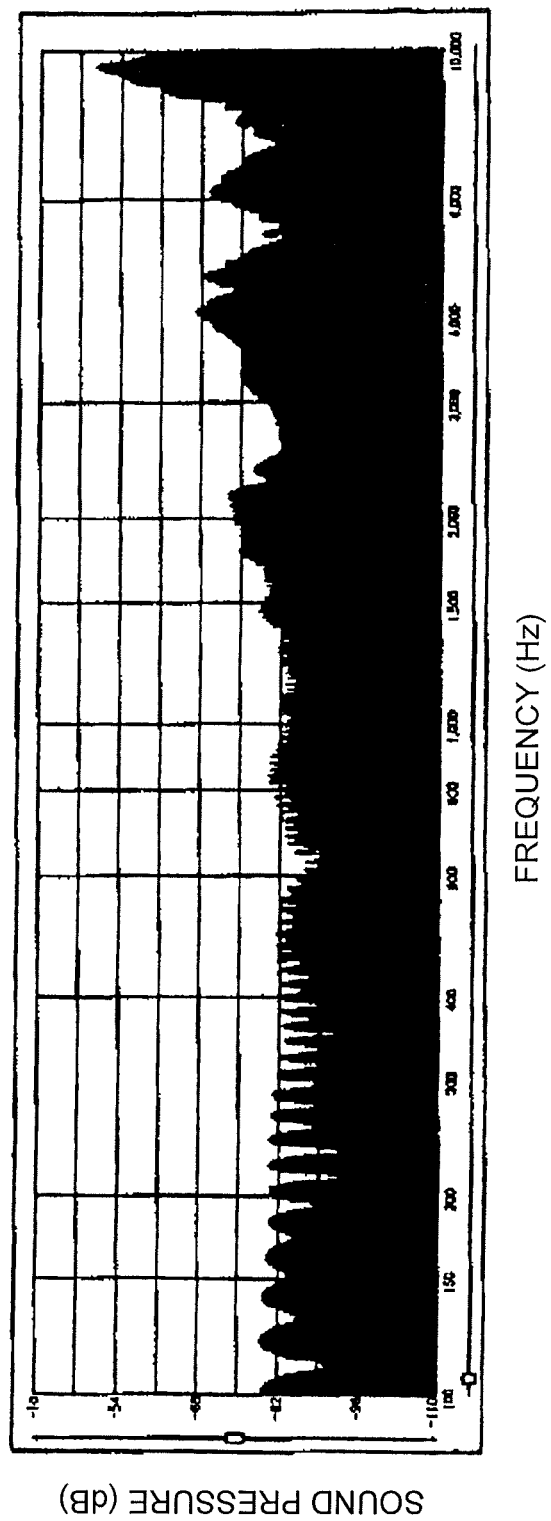
FIG. 8 is a graph showing a result of a frequency analysis on a turn-signal sound of a mechanical relay.
Figure 9:
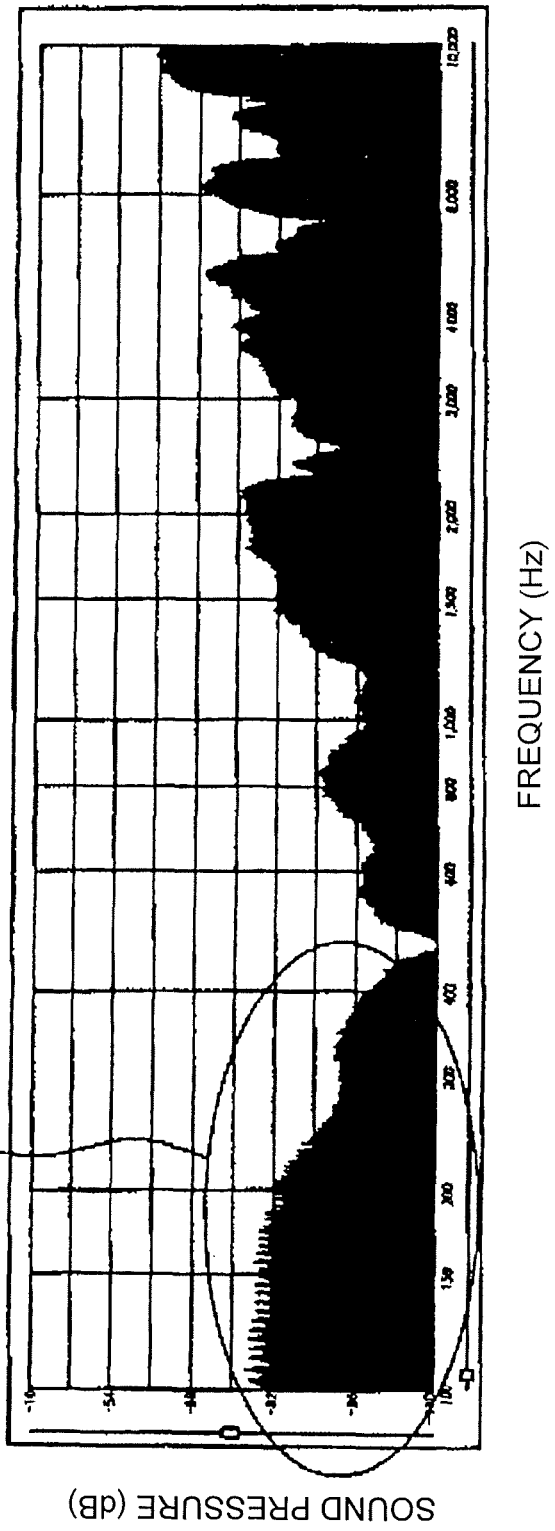
FIG. 9 is a graph showing a processed result of a frequency analysis of the turn-signal sound of the mechanical relay.

Referring now to FIG. 8 and FIG. 9, the following will explain how the frequency of the pulse signal for turn-signal sound is determined in order to output the turn-signal sound close to the operating sound of the mechanical relay from the speaker 5. FIG. 8 shows a result of the frequency analysis on the turn-signal sound of the mechanical relay. As shown in FIG. 8, the turn-signal sound of the mechanical relay is widely distributed across the audible region. Therefore, by determining the frequency and the duty ratio of the pulse signal for turn-signal sound so as to vary according to the frequency and the sound pressure corresponding to the frequency included in the operating sound of the mechanical relay (i.e. to vary fast within 100 Hz to 10000 Hz), the speaker 5 can output the turn-signal sound close to the operating sound of the mechanical relay.

However, it is not easy to adjust the pulse signal for turn-signal sound to vary across the wide audible region in a short period of time for producing the turn-signal sound. Thus, it is necessary to eliminate the unnecessary frequency components from the pulse signal for turn-signal sound while leaving the audibly efficient frequency components. Therefore, in this embodiment, the frequency components which are out of the frequency range of the speaker 5 (e.g. the frequency components equal or smaller than 500 Hz) are eliminated from the pulse signal for turn-signal sound. In addition, considering the fact that the square wave contains many odd harmonics, the frequency components corresponding to the odd multiple of the corresponding frequency are also eliminated.

The following is an example of the elimination of the odd multiple frequency components. Firstly, a frequency analysis is conducted on the turn-signal sound of the mechanical relay having the frequency property as shown in FIG. 8, by eliminating the odd multiple frequency components while leaving only the fundamental frequency, and subjecting to a dynamic control process using a noise gate or a compressor. The result of the analysis shown in FIG. 9 shows that, before processing, the frequency components are widely distributed across the audible region, whereas after the processing, only the specific frequency components are distributed forming peaks. Thus, by controlling the pulse signal for turn-signal sound to vary according to the frequency peaks, the odd multiple frequency components of the corresponding frequency can be eliminated.

As described above, the frequency components which are out of the frequency range of the speaker 5 are eliminated from the pulse signal for turn-signal sound. Thus, the time for outputting the pulse signal for turn-signal sound with the frequency components which cannot be produced by the speaker 5 can be eliminated, thus the time can be used efficiently for outputting the pulse signal for turn-signal sound having the frequency components which can be produced by the speaker 5. As a result, high-quality turn-signal sound can be produced.

Furthermore, considering the fact that the pulse signal contains the odd harmonics, the odd multiple frequency components of the corresponding frequency are eliminated from the pulse signal for turn-signal sound. Thus, the time for outputting the unnecessary pulse signal for turn-signal sound can be eliminated, thus the time can be used efficiently for outputting the efficient pulse signal for turn-signal sound. As a result, high-quality turn-signal sound can be produced.

In the embodiment described herein, the analog signal for turn-signal sound and the analog signal for alarm sound are summed together to simultaneously output the turn-signal sound and the alarm sound from the speaker 5. However, the present invention is not limited to this regard, and for example, two speakers may be used to output the turn-signal sound and the alarm sound separately.

In addition, in the embodiment described herein the frequency distribution varies across the audible region. However, the present invention is not limited to this regard, and the frequency distribution may vary according to the user's demand.

It should be understood that the embodiment included herein is only a representative embodiment, and is not intended to limit the present invention. That is, the present invention may be modified in a variety of ways and performed within a scope of the present invention.

LIST OF REFERENCE SIGNS

1 sound-generating device for turn-signal sound of vehicle
2 CPU (central processing unit)
4 summation circuit (summation means)
5 speaker
31 integration circuit (integration means)

The invention claimed is:

1. A method for generating turn-signal sound of a vehicle, comprising the steps of:
   outputting a pulse signal for turn-signal sound from a pulse pattern generator, the pulse signal for turn-signal sound having varying frequency and duty ratio;
   converting the pulse signal for turn-signal sound into an analog signal for turn-signal sound by integrating the pulse signal for turn-signal sound; and
   outputting the analog signal for turn-signal sound to a speaker.

2. The method as claimed in claim 1, further comprising the steps of: outputting a pulse signal for alarm sound from a sound generator, the pulse signal for alarm sound having a constant frequency and a constant duty ratio; converting the pulse signal for alarm sound into an analog signal for alarm sound by integrating the pulse signal for alarm sound; summing up the analog signal for turn-signal sound and the analog signal for alarm sound; and outputting the summed signal instead of the analog signal for turn-signal sound to the speaker.

3. The method as claimed in claim 2, wherein the pulse signal for turn-signal sound outputted from the pulse pattern generator has the frequency and the duty ratio arranged to vary according to the frequency and a sound pressure corresponding to the frequency included in an operating sound of a mechanical relay.

4. The method as claimed in claim 1, wherein the pulse signal for turn-signal sound outputted from the pulse pattern generator has the frequency and the duty ratio arranged to vary according to the frequency and a sound pressure corresponding to the frequency included in an operating sound of a mechanical relay.

5. A device for generating turn-signal sound of a vehicle, comprising:
   a central processing unit for outputting from a pulse pattern generator a pulse signal for turn-signal sound having varying frequency and duty ratio;
   an integration unit for integrating the pulse signal for turn-signal sound to convert the pulse signal for turn-signal sound into an analog signal for turn-signal sound; and
   a speaker to which the analog signal for turn-signal sound is outputted.

* * * * *